United States Patent [19]

Schiffler et al.

[11] Patent Number: 5,492,051

[45] Date of Patent: Feb. 20, 1996

[54] ROTARY ACTUATOR WITH A MODIFIED SEAL STRUCTURE

[75] Inventors: Stefan Schiffler, Schonungen; Robert Pradel, Röthlein, both of Germany

[73] Assignee: Fichtel & Sachs AG, Schweinfurt, Germany

[21] Appl. No.: 331,005

[22] Filed: Oct. 28, 1994

[30] Foreign Application Priority Data

Nov. 5, 1993 [DE] Germany ............ 43 37 815.3

[51] Int. Cl.$^6$ .................................................. F01C 9/00
[52] U.S. Cl. .................................................. 92/125; 92/121
[58] Field of Search .......................... 92/121, 122, 124, 92/125

[56] References Cited

U.S. PATENT DOCUMENTS

| | | | |
|---|---|---|---|
| 2,966,144 | 12/1960 | Self ............................ | 92/125 |
| 2,984,221 | 5/1961 | Van Voorhees ............ | 92/122 |
| 3,023,741 | 3/1962 | O'Connor ................... | 92/122 |
| 3,030,934 | 4/1962 | Herbst ........................ | 92/122 |
| 3,207,047 | 9/1965 | O'Connor ................... | 92/124 |
| 3,215,046 | 11/1965 | Drake ......................... | 92/125 |

FOREIGN PATENT DOCUMENTS

| | | | |
|---|---|---|---|
| 899178 | 10/1953 | Germany ..................... | 92/125 |
| 1955711 | 5/1979 | Germany . | |
| 4229025 | 3/1994 | Germany . | |
| 848870 | 9/1960 | United Kingdom ......... | 92/125 |

Primary Examiner—Thomas E. Denion
Attorney, Agent, or Firm—Nils H. Ljungman & Associates

[57] ABSTRACT

Rotary actuator, including a cylinder and motor shaft, as well as end caps which define a work chamber, whereby a number of ribs on the inside surface of the cylinder and the same number of vanes on the motor shaft divide the working area into work chambers which are alternately supplied with hydraulic medium, and seal units inside grooves in the ribs and vanes which hydraulically separate the work chambers from one another, characterized by the fact that there is a space between the seals and the side walls of the grooves which is offset by an additional volume.

20 Claims, 6 Drawing Sheets

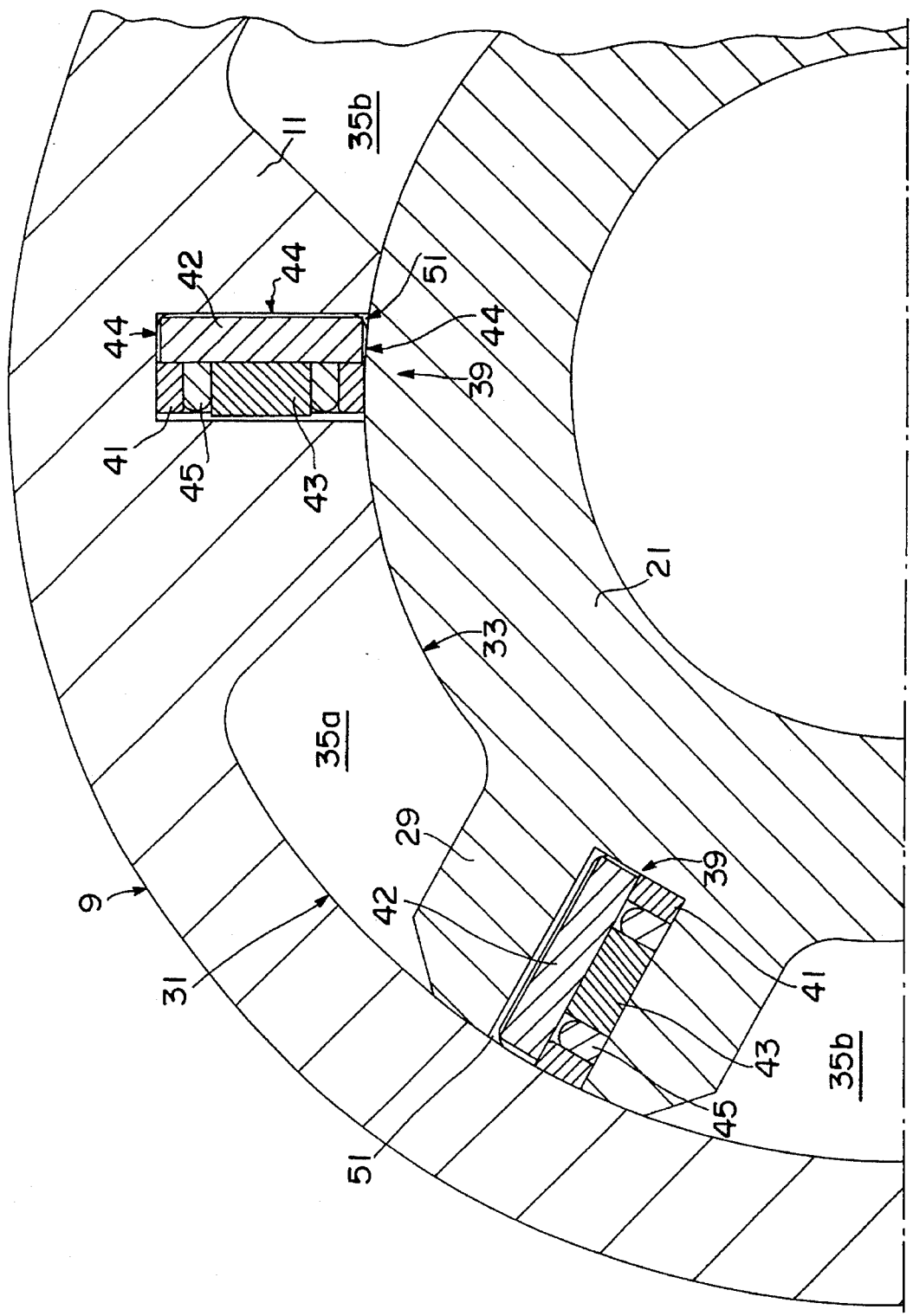

ROTARY ACTUATOR WITH A MODIFIED SEAL STRUCTURE

BACKGROUND OF THE INVENTION

1. Field of the Invention

The invention relates to a rotary actuator, having a cylinder and motor shaft, as well as end caps which define a work chamber. A number of ribs on the inside surface of the cylinder and an equal number of vanes on the motor shaft divide the working area into work chambers which are alternately supplied with hydraulic medium. In addition, seal units can be provided inside grooves in the ribs and vanes to hydraulically separate the work chambers from one another.

2. Background Information

Rotary actuators are known on which a manufacturing problem occurs in manufacturing the grooves for the seal units in the ribs and vanes. The seal unite used have a width/weight ratio which is unfavorable for machining the inside of the cylinder. Previously, the grooves could only be manufactured to within the required tolerances by means of very costly and complex manufacturing processes, such as spark erosion or slotting. The associated manufacturing expense is unacceptable for large-seals series production. More economical manufacturing processes, such as broaching with a broaching tool, have failed in the past because the broaching tools broke very quickly due to their small cross-section.

OBJECT OF THE INVENTION

The object of the present invention is to solve the problems associated with the known arrangements at the least possible expense, so that large-scale series production can be carried out at an acceptable cost.

SUMMARY OF THE INVENTION

To achieve this object, the present invention teaches that there can be a space between the seals and the side walls of the grooves which space can generally be offset by means of an additional volume.

The space makes it possible to have a groove width which is generally independent of the width of the seal unit, i.e., the groove width can be larger than the width of the seal unit. The width of the groove can thereby advantageously be adapted to the width of a processing tool. The additional volume can, on the one hand, be made of an economical material, and on the other hand the additional volume can be manufactured to less stringent tolerances.

A particularly advantageous embodiment of the present invention has the additional volume preferably attached to one side of the seal unit. For example, a simple plastic disk or sheet can be used, which can be inserted in the grooves together with the seal unit.

Alternatively, it can be possible to form the added volume as a single piece with a segment of the seal unit. With such a configuration, there can generally be a decisive improvement in handling during installation of the seal unit with the additional volume.

Depending on the construction of the rotary actuator, additional axial seals can be used which are pressurized with hydraulic medium to increase the sealing action of the axial seals. The grooves must generally be covered by the seal units inside the ribs so that essentially no hydraulic medium can overflow via the grooves from a pressurized work chamber into an unpressurized chamber. In one embodiment of the present invention, the seal unit with the additional volume can be oriented so that the seal unit lies approximately in the middle of the rib or vane. With its additional volume, the seal unit generally has an irregular cross-section. A compulsory orientation thus also serves generally to maintain the prestressing of the seal unit. The prestressing of the seal unit can be defined on the assumption that the seal unit is always in contact with a defined groove side wall. If the seal unit is in contact against the side wall of the groove opposite the specified side wall of the groove, the radius of curvature of the inside cylinder wall or motor shaft generally reduces the prestressing of the seal unit by means of a vertical offset resulting from the radius of curvature.

A further embodiment for the compulsory orientation teaches that this orientation can be achieved by means of a shoulder inside the groove, in which the additional volume, which also has a shoulder on its contour, can be engaged. During installation, the seal unit generally cannot be improperly inserted into the groove since the contours of the grooves and the seal units generally do not match as a result of their shoulders.

An alternative embodiment can be characterized by the fact that the groove has a large and a small groove floor radius, whereby the one groove floor radius generally matches the contour of the seal unit and the other groove floor radius generally matches the contour of the additional volume. A groove floor radius is the radius of curvature of the surface between the floor of the groove and a wall of the groove. The different shapes of the radii are designed to perform essentially the same purpose as the shoulder as discussed above, which to some extent can reduce the demands on the tool used to manufacture the grooves.

So that the seal unit can be pressurized by means of hydraulic medium to increase the sealing action, the additional volume has a profile which generally ensures the flow of hydraulic medium against the seal unit.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in a rotary actuator comprising: cylinder apparatus; shaft apparatus; the shaft apparatus being at least partially surrounded by at least a portion of the cylinder apparatus; the shaft apparatus having a length and defining a longitudinal axis along the length thereof; at least one of the shaft apparatus and the cylinder apparatus being rotatable about the longitudinal axis with respect to the other of the shaft apparatus and the cylinder apparatus; the shaft apparatus comprising an outer wall surface; at least a portion of the outer wall surface being disposed a substantial distance from the longitudinal axis; the cylinder apparatus comprising an inner wall surface; at least a portion of the inner wall surface being disposed about and towards the outer wall surface; at least a portion of the inner wall surface being disposed substantially concentrically with respect to at least a portion of the outer wall surface to define a chamber therebetween; the chamber comprising hydraulic fluid; at least one of the shaft apparatus outer wall surface and the cylinder apparatus inner wall surface comprising at least one projection between the outer wall surface and the inner wall surface to divide the chamber into a first chamber portion and a second chamber portion; the at least one projection comprising at least one groove disposed in the at least one projection towards the other of the shaft apparatus outer wall surface and the cylinder apparatus inner wall surface; the at least one groove having a volume; apparatus for sealing disposed in the at least one groove to minimize fluid flow between the first chamber portion and the second chamber portion; the apparatus for sealing comprising: a first body apparatus; a second body apparatus separate from the first body apparatus; the first body apparatus filling a first portion of the volume of the at least one groove; the second body apparatus filling a second portion of the volume of the at least one groove; the first body apparatus comprising apparatus for sealing a fluid to minimize flow of fluid between the inner wall surface and the outer wall surface by making sealing contact against one of the inner wall surface and the outer wall surface; the first portion comprising a substantial portion of the volume of the at least one groove; the second portion comprising a substantial portion of the volume of the at least one groove.

BRIEF DESCRIPTION OF THE DRAWINGS

The present invention and its significant advantages are described in greater detail below with reference to the accompanying drawings in which.

DESCRIPTION OF THE PREFERRED EMBODIMENT

Figure 1:
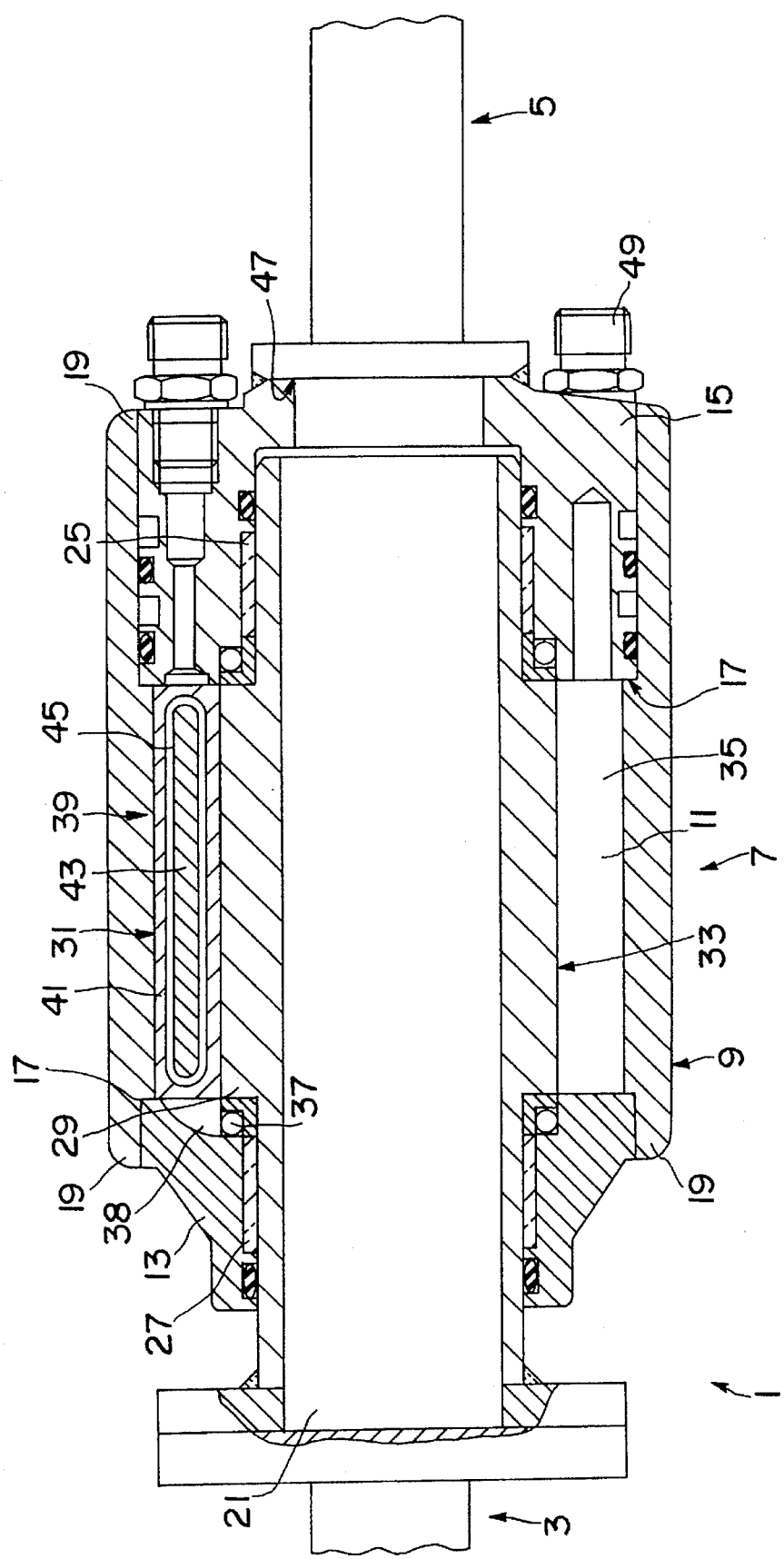
FIG. 1 schematically illustrates a longitudinal section of a rotary actuator.

By way of example, FIG. 1 shows the orientation of a rotary actuator in a stabilizer apparatus 1 preferably including a divided stabilizer with the stabilizer parts 3 and 5 and a rotary actuator 7. For reasons of simplicity, the ends of the stabilizers connected to the respective wheel control arms are not shown as such connections are typically well known.

The rotary actuator 7 preferably includes, among other things, a cylinder 9 with ribs 11 running axially on an inside diameter of the cylinder 9. The ribs 11 and the cylinder 9 are preferably realized as one piece. However, the ribs 11 could also be separate pieces which are fitted to the cylinder 9. A cap 13 and a cap 15 on the two ends of the cylinder 9 preferably define, in conjunction with the cylinder 9, a work chamber 35. The positioning of the caps 13 and 15 inside the cylinder 9 is preferably determined by the end surfaces 17 of the ribs 11. There is preferably a weld joint 19 in the end regions of the rotary actuator 7 between the caps 13 or 15 and the cylinder 9 to fasten the caps 13, 15 to the cylinder 9.

A motor shaft 21 is preferably rotationally mounted in the work chamber by means of friction bearings 25, 27. The motor shaft 21 can preferably have a number of vanes 29 on its outside diameter. The vanes 29 can preferably have the see axial orientation as the ribs 11 of the cylinder 9. The ribs 11 and the inside wall surface 31 of the cylinder 9, and also the vanes 29 and the outside jacket surface 33 of the motor shaft 21 preferably form work chambers 35a, 35b (shown in FIG. 2a). The work chambers 35a, 35b can preferably be sealed by means of angular joint gaskets 37 at the base of the vanes 29, between the caps 13, 15 and the vanes. The end faces of the vanes 29 and the ribs 11 are preferably sealed by means of seals 39 so that adjacent work chambers 35a, 35b can be hydraulically separated from one another. The seals 39 are preferably realized utilizing a "window design." The seals 39 preferably include a frame-like seal part 41 and an inside part 43. The two seal parts 41, 43 are preferably separated by an O-ring 45, which can apply a slight prestress to the seal parts 41, 43. When installed, the operating pressure inside the work chambers 35a, 35b generally increases the prestress applied by the O-ring 45 to the seal parts 41, 43, to thereby generally provide a dynamic seal. The same principle can preferably be used to prestress the angular joint gaskets 37, which are preferably pressurized by the hydraulic medium. At least one recess 38 in the two caps 13, 15, which are preferably sealed by means of a seal 39 when the rotary actuator 7 is under pressure, can ensure that when the rotary actuator 7 is unpressurized, the hydraulic pressure from the angular joint gaskets 37 can be dissipated on the unpressurized seals 39. Therefore, no axial forces due to contained pressures can occur in the vicinity of the angular joint gaskets 37.

The cap 15 is preferably equipped with a first 47 and a second 49 hydraulic connection, which are preferably oriented parallel to the principal axis of the rotary actuator 7. Each of the two hydraulic connections 47, 49 can preferably be directly connected to one of the work chambers 35a, 35b. In addition, by means of a system of interconnections which are not shown, but which are generally well known, there can preferably be a connection between the work chambers 35a, or between the work chamber 35b, with the same indexing. The interconnected work chambers 35a of the first hydraulic connection 47 preferably alternate with the work chambers 35b of the second hydraulic connection 49.

Figure 2B:
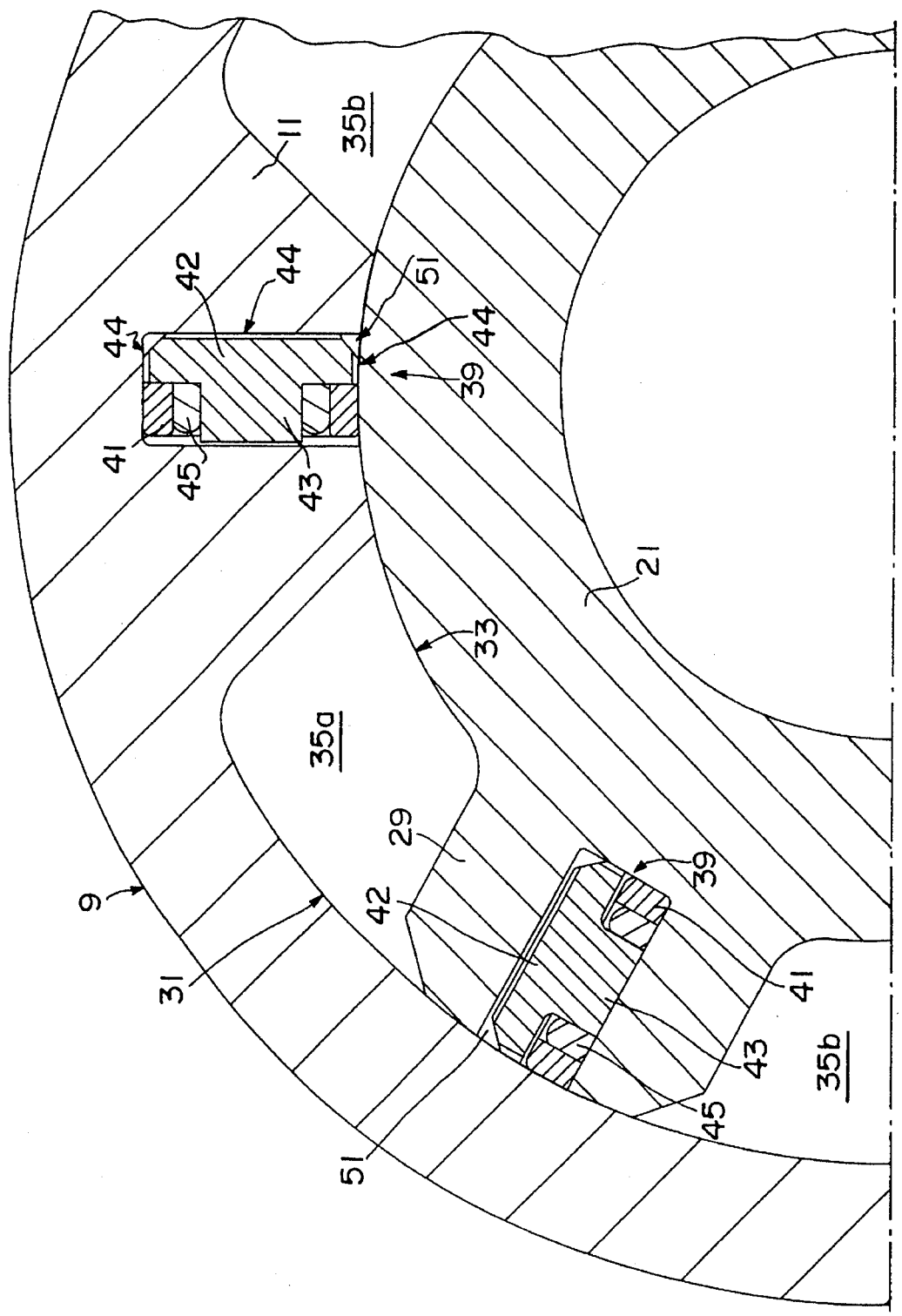
FIGS. 2a, 2b, 2c, 2c' and 2d schematically illustrate cross-sections of a rotary actuator.
Figure 2C:
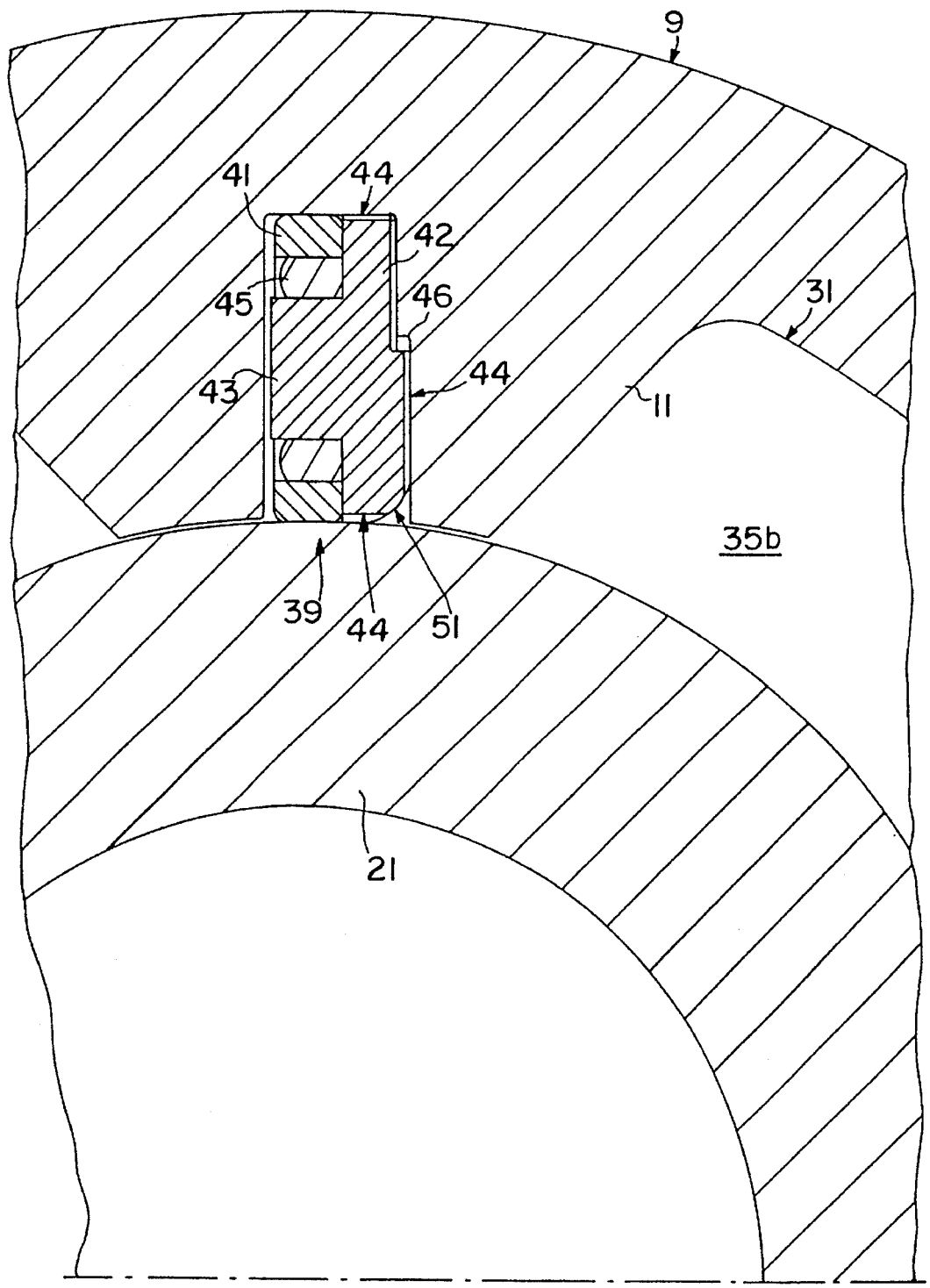
Figure 2C:
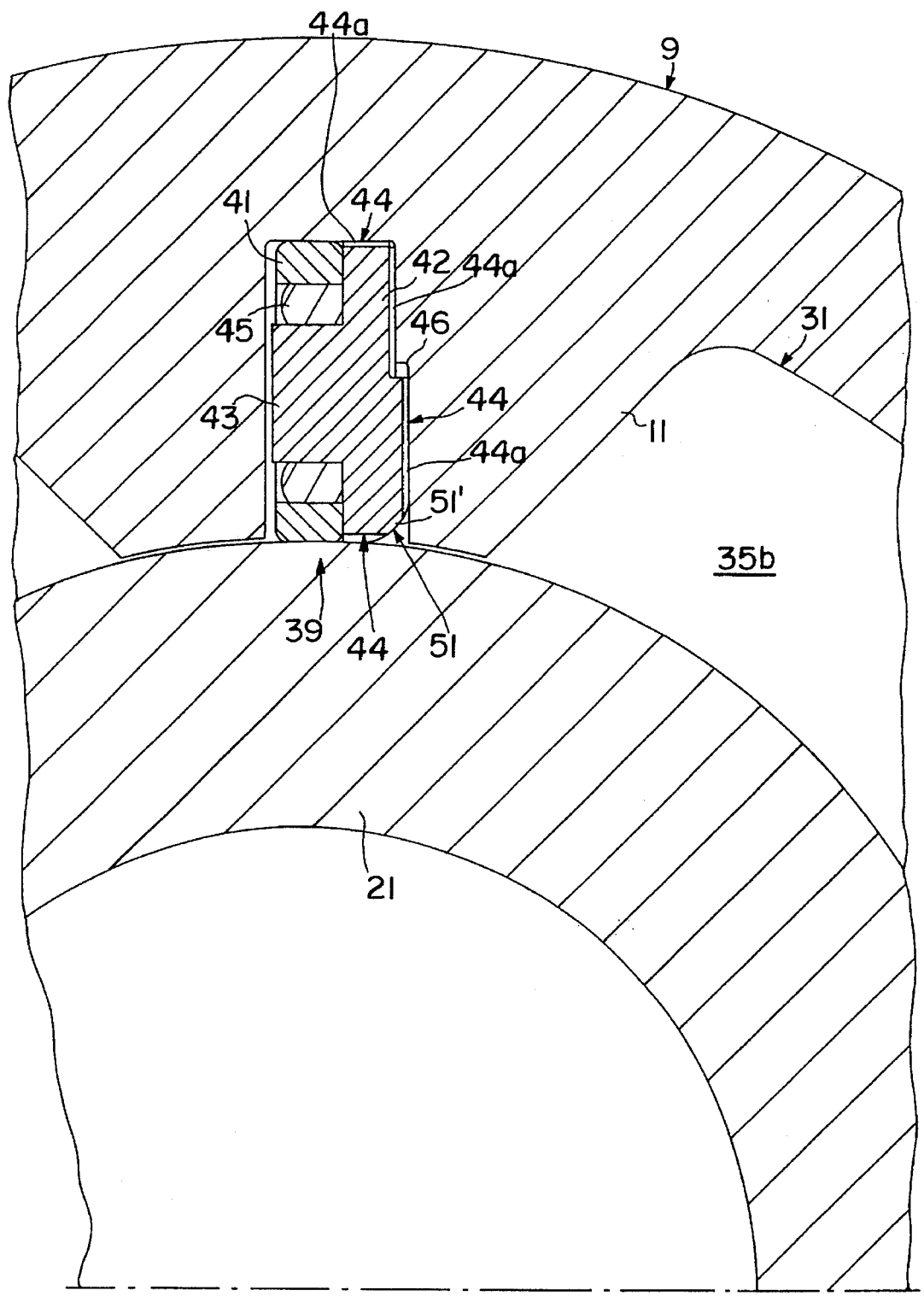

FIGS. 2a, 2b, 2c, 2c', and 2d show a cross-section through the rotary actuator 7 in the vicinity of the vanes 29 or ribs 11. Not all of the parts labeled in FIGS. 2a, 2b, 2c, 2c', and 2d are discussed in the discussion of the individual figures. However, discussions for labeled parts of a figure may be found in the discussions of the other figures. Inside the vanes 29 and ribs 11, the seals 39 are preferably enclosed in grooves These grooves 51 preferably have a width/height ratio which makes it possible to use broaching tools for forming the grooves 51. The seal 39 can generally be very narrow and can leave a space which can be offset by an additional volume 42. The additional volume 42 is preferably a simple disk or sheet which can be inserted into the grooves 51 during assembly, preferably at the same time as the seal 39. The disk can preferably be formed from a less expensive material and can also be subject to less stringent tolerances. The additional volume 42, realized as a disk, preferably has a contour 44 which can make possible a flow of hydraulic medium against the seal 39 to achieve a dynamic sealing action. The additional volume 42 generally reduces the amount of seal material which would otherwise be needed to fill the space, which amount of material, in the case of the present invention, would be increased on account of the increased width of the groove 51. Because of the materials and conditions required for the manufacture of the seals 39, these special seals are very expensive, so that the use of the additional volume 42 generally represents no significant price disadvantage compared to the solution of known arrangements.

FIG. 2b is essentially the same as the embodiment illustrated in FIG. 2a, with the exception that the inside seal part 43 and the additional volume 42 are preferably consolidated into a single component. Such a consolidation can essentially reduce the complexity and cost of assembly and installation. With the depicted embodiment of FIG. 2b, the O-ring 45 and seal part 41 can preferably be installed directly onto the additional volume 42, and the entire assembly could then easily be inserted into the groove 51.

An additional assembly problem can be solved by the embodiment depicted in FIG. 2c. In the embodiment, the seal unit 39 should always preferably lie essentially in the middle of the vane 29 or rib 11 and preferably against the opposing surfaces to be sealed. For this purpose, the cross-sections of the grooves 51 are preferably slightly offset from center by about one half of the thickness of the additional volume 42. The additional volume 42 and the seal unit 39 together generally have an asymmetrical cross-section so that it could occur that the seal 39 could preferably be disposed within the groove 51 with the seal 39 in contact against either one side wall or the other side wall of the groove 51. With an offset groove 51, in accordance with the embodiment of FIG. 2c, the prestressing of the seal 39 can thereby fluctuate greatly as a function of the radius of curvature of the seal surfaces 31, 33. Furthermore, the recesses 38 (shown in FIG. 1) must preferably be covered by the end surfaces of the seal 39 so that there is no cross-over between the work chambers 35a, 35b.

Thus, in order to avoid an improper insertion of the seal 39 into the groove 51, the seal 39, with its additional volume 42, preferably has, by means of a shoulder 46 in the side wall of the groove 51, a compulsory orientation of the seal 39. Thus, since the additional volume 42 can preferably have a contour 44 which essentially matches the shoulder 46, the seal can preferably only be inserted in one position within the groove 51, thereby avoiding any prestress problems which could arise.

FIG. 2c' is a further embodiment of FIG. 2c. The contour 44 of the additional volume 42 includes a series of grooves 44a that allows the flow of hydraulic fluid towards the seal 39. The flow of hydraulic fluid can thereby assist in the sealing function of the seal 39 by applying fluid pressure to the seal 39 and adding to the prestress of the seal 39. Each of the embodiments discussed above and below may feature such grooves 44a as depicted by this additional embodiment. FIG. 2c' also shows chamfers 51' in the groove 51 and in the additional volume 42 which preferably aid in aligning the sealing mechanism in the groove 51.

Figure 2D:
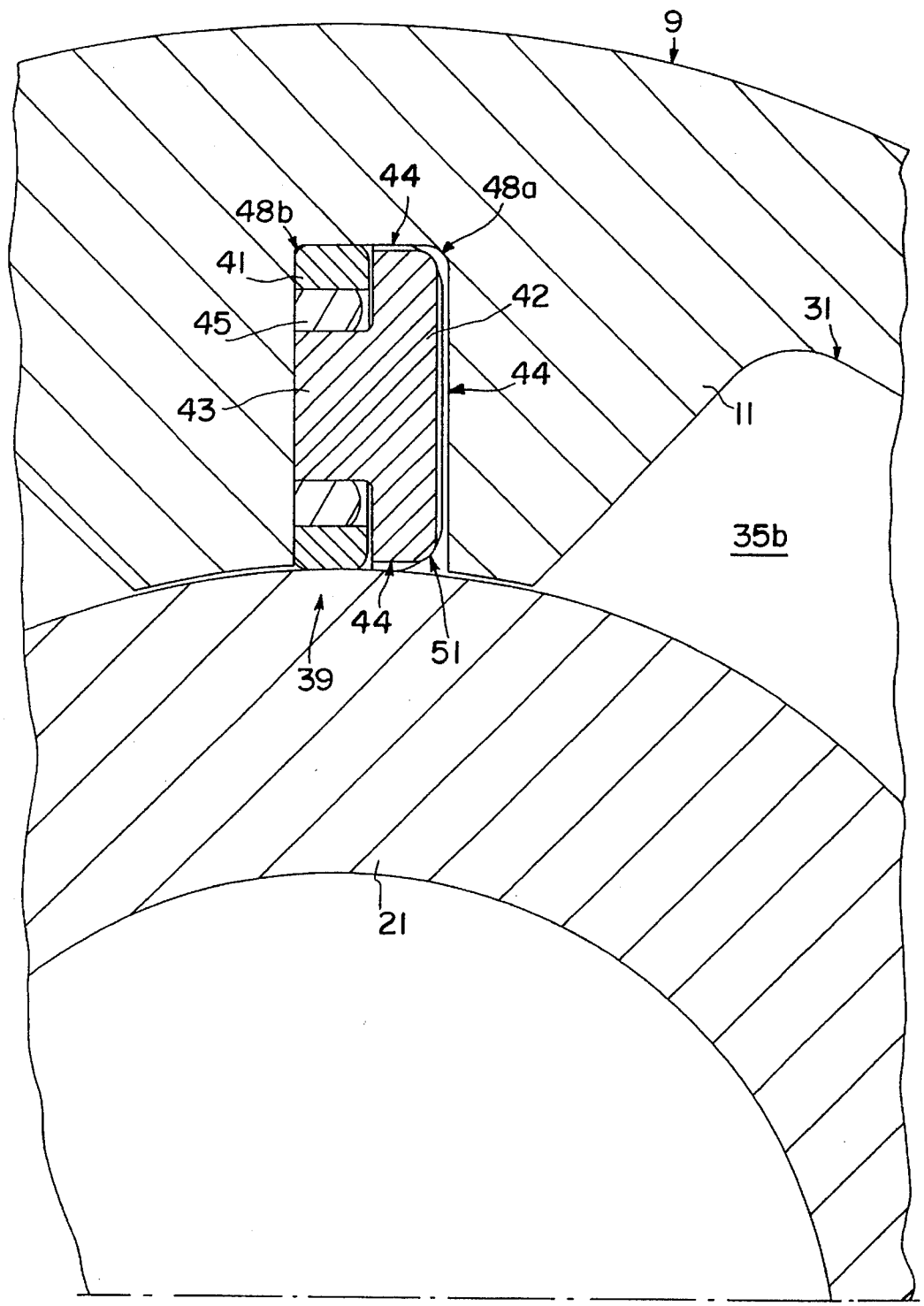

In the embodiment of FIG. 2d, the problem discussed above with regard to orientation of the seal 39 in groove 51 is preferably solved by means of different groove radii 48a, 48b. The additional volume 42 and the seal 39 each preferably match one of the radii 48a, 48b with their contour. The likewise asymmetrical cross-section of the seal unit 39 in association with the additional volume 42 means that the seal unit 39 preferably cannot be installed in the incorrect position.

An additional embodiment not shown in the figures eliminates the need for an O-ring seal 45. The present invention may also use a solid seal in the groove next to the additional volume 42 instead of the tri-partite seals as discussed above. Such a seal would also eliminate the need for the internal portion of the seal 43.

One feature of the invention resides broadly in the rotary actuator, consisting of a cylinder and a motor shaft, as well as end caps which define a work chamber, whereby a number of ribs on the inside surface of the cylinder and the same number of vanes on the motor shaft divide the working area into work chambers which are alternately supplied with hydraulic medium, and seal units inside grooves in the ribs and vanes which hydraulically separate the work chambers from one another, characterized by the fact that there is a space 51 between the seals 39 and the side walls of the grooves which is offset by an additional volume 42.

Another feature of the invention resides broadly in the rotary actuator characterized by the fact that the additional volume 42 is attached to one side of the seal unit 39.

Yet another feature of the invention resides broadly in the rotary actuator characterized by the fact that the additional volume 42 is realized as a single piece with one segment 41, 43 of the seal unit 39.

still another feature of the invention resides broadly in the rotary actuator characterized by the fact that the seal unit 39 with the additional volume 42 has a compulsory orientation, so that the seal unit is located approximately in the middle of the rib 11 or vane 29.

A further feature of the invention resides broadly in the rotary actuator characterized by the fact that the orientation is achieved by means of a shoulder 46 inside the groove, which is engaged by the additional volume 42, which also has a shoulder on its contour.

Another feature of the invention resides broadly in the rotary actuator characterized by the fact that the groove has a large 48a and a small groove floor radius 48b, whereby the one groove floor radius matches the contour of the seal unit and the other groove floor radius matches the contour of the additional volume 42.

Yet another feature of the invention rotary actuator according to any of the preceding claims, characterized by the fact that the additional volume 42 has a contour 44 which makes possible a flow of hydraulic medium against the seal unit 39.

Some types of rotary actuators that could be utilized in accordance with the present invention may be or are disclosed by the following U.S. Pat. No. 5,332,236 to Kastuhara et al., entitled "Sealing Mechanism for a Rotary Actuator"; U.S. Pat. No. 5,309,816 to Weyer, entitled "Rotary Actuator with External Bearings"; U.S. Pat. No. 5,267,504 to Weyer, entitled "Rotary Actuator with Annular Fluid Coupling Rotatably Mounted to Shaft"; and U.S. Pat. No. 5,310,021 to Hightower, entitled "Motor-driven, Spring-returned Rotary Actuator".

Some types of seals that could be utilized in accordance with the present invention may be or are disclosed by the following U.S. Pat. No. 5,234,194 to Smith, entitled "Seal for a Shaft"; U.S. Pat. No. 5,190,299 to Johnston, entitled "Radially Undulating Shaft Seal"; U.S. Pat. No. 5,259,737 to Kamisuki et al., entitled "Micropump with Valve Structure"; U.S. Pat. No. 5,250,607 to Comert et al., entitled "Moisture Cured Elastomeric Interpenetrating Network Sealants"; U.S. Pat. No. 5,321,964 to Shimanovski et al., entitled "External Seal Device for Tube Hydroforming"; and U.S. Pat. No. 5,233,856 to Shimanovski et al., entitled "External Seal Unit for Tube Hydroforming".

Some types of neoprene plastics that could be utilized to fill the additional volume in accordance with the present invention may be or are disclosed by the following U.S. Pat. No. 5,266,856 to Holter, entitled "Vibration Reduction for Electric Motors"; U.S. Pat. No. 5,264,467 to DiStefano, entitled "High Performance Solvent-Free Contact Adhesive"; U.S. Pat. No. 5,281,651 to Arjunan and Kusznir, entitled "Compatibilization of Dissimilar Elastomer Blends Using Ethylene/Acrylate/Acrylic Acid Terpolymers"; and U.S. Pat. No. 5,324,758 to Takahashi et al., entitled "Vibration Damping Material of Asphalt Cement".

Some types of polyvinyl chloride plastics that could be utilized to fill the additional volume in accordance with the present invention may be or are disclosed by the following U.S. Pat. No. 5,209,931 to Levin, entitled "Stabilized PVC Products and their Production"; U.S. Pat. No. 5,210,140 to Greenlee et al., entitled "Polyvinyl Chloride Blends"; U.S. Pat. No. 5,219,936 to Honkomp et al., entitled "High Impact PVC/Polycarbonate Alloy Compositions"; U.S. Pat. No. 5,221,713 to Kempner et al., entitled "Co-microagglomeration of Emulsion Polymers (Encapsulated Core/Shell Additives for PVC)"; and U.S. Pat. No. 5,274,043 to Greenlee et al., entitled "Chlorinated PVC Blends".

Some types of polyethylene and polypropylene plastics that could be utilized to fill the additional volume in accordance with the present invention may be or are disclosed by the following U.S. U.S. Pat. No. 5,186,991 to Samuel and Williams, entitled "Container Closures, Sealed Containers and Sealing Compositions for Them"; U.S. Pat. No. 5,219,083 to Liebert and Brown, entitled "stopper for Reduction of Particulate Matter"; and U.S. Pat. No. 5,287,961 to Herran, entitled "Multi-compartment Package Having Improved Partition Strip".

Some types of O-ring seals that could be utilized in accordance with the present invention may be or are disclosed by the following U.S. Pat. No. 5,217,236 to Kitamura, entitled "O-ring Seal of Geared-motor"; U.S. Pat. No. 5,323,863 to Denton, entitled "O-ring Seal for Rock Bit Bearings"; U.S. Pat. No. 5,312,116 to Quaglia, entitled "Self-adjusting O-ring Seal Product to Retain Internal Bearing Lubricants and Pneumatic Pressure"; U.S. Pat. No. 5,294,133 to Dutta, entitled "Fluid-filled O-ring for Maintaining a Seal Under Low Temperature Conditions"; and U.S. Pat. No. 5,222,773 to Boehme, entitled "Easy-off Seal Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A rotary actuator comprising:
cylinder means;
shaft means;
said shaft means being at least partially surrounded by at least a portion of said cylinder means;
said shaft means having a length and defining a longitudinal axis along the length thereof;
at least one of said shaft means and said cylinder means being rotatable about said longitudinal axis with respect to the other of said shaft means and said cylinder means;
said shaft means comprising an outer wall surface;
at least a portion of said outer wall surface being disposed a substantial distance from said longitudinal axis;
said cylinder means comprising an inner wall surface;
at least a portion of said inner wall surface being disposed about and towards said outer wall surface;
at least a portion of said inner wall surface being disposed substantially concentrically with respect to at least a portion of said outer wall surface to define a chamber therebetween;
said chamber comprises hydraulic fluid;
at least one of:
   said shaft means outer wall surface, and
   said cylinder means inner wall surface comprising at least one projection between said outer wall surface and said inner wall surface to divide said chamber into a first chamber portion and a second chamber portion;
said at least one projection comprising at least one groove disposed in said at least one projection towards the other of:
   said shaft means outer wall surfacer and
   said cylinder means inner wall surface;
said at least one groove having a volume;
means for sealing disposed in said at least one groove to minimize fluid flow between said first chamber portion and said second chamber portion;
said means for sealing comprising:
   a first body means;
   a second body means separate from said first body means;
   said first body means filling a first portion of the volume of said at least one groove;
   said second body means filling a second portion of the volume of said at least one groove;
said first body means comprising means for sealing the fluid to minimize flow of the fluid between said inner wall surface and said outer wall surface by making sealing contact against one of said inner wall surface and said outer wall surface;
said first portion comprising a substantial portion of the volume of said at least one groove;
said second portion comprising a substantial portion of the volume of said at least one groove;
said second body means not comprising means for sealing a fluid by making sealing contact against one of said inner wall surface and said outer wall surface;
said at least one groove comprising a width in a circumferential direction about said longitudinal axis;
said first body means comprising a first body; said second body means comprising a second body;
said first body and said second body comprising different materials; and
at least a portion of said first body being disposed adjacent to at least a portion of said second body in a circumferential direction across a substantial portion of the width of said at least one groove.

2. The rotary actuator according to claim 1 wherein said first body and said second body are separate bodies moveable with respect to one another.

3. The rotary actuator according to claim 2 wherein said first body and said second body are disposed in intimate contact with one another.

4. The rotary actuator according to claim 3 wherein:

said at least one projection has a first side disposed towards said first chamber portion;

said at least one projection has a second side disposed towards said second chamber portion;

said at least one projection comprises a middle portion between said first side and said second side in a circumferential direction with respect to said longitudinal axis;

said at least one groove is offset circumferentially from said middle portion of said at least one projection;

said second body is offset circumferentially from said middle portion; and said means for sealing is disposed so that said first body is positioned in the middle of said at least one projection.

5. The rotary actuator according to claim 4 wherein said second body comprises means for permitting the fluid to flow across said second body to provide sealing the fluid pressure against said first body to assist in the sealing operation of said first body.

6. The rotary actuator according to claim 5 wherein said means for permitting the fluid to flow across said second body comprises a plurality of grooves.

7. The rotary actuator according to claim 6 wherein said plurality of grooves comprises a plurality of radial grooves.

8. The rotary actuator according to claim 7 wherein said plurality of grooves additionally comprises a plurality of circumferential grooves.

9. The rotary actuator according to claim 8 wherein:

said at least one projection has a first side disposed towards said first chamber portion;

said at least one projection has a second side disposed towards said second chamber portion;

said at least one projection comprises a middle portion between said first side and said second side in a circumferential direction with respect to said longitudinal axis;

said at least one groove is offset circumferentially from said middle portion of said at least one projection;

said second body is offset circumferentially from said middle portion; and said means for sealing is disposed so that said first body is positioned in the middle of said at least one projection.

10. The rotary actuator according to claim 9 wherein:

said second body comprises a first portion and a second portion;

said second portion of said second body projects into said first body; and said first body surrounds said second portion of said second body.

11. The rotary actuator according to claim 10 wherein:

said means for sealing further comprises an O-ring; and said O-ring separating said second portion of said second body from said first body.

12. The rotary actuator according to claim 11 wherein said at least one groove and said second body each comprise at least one chamfer for aligning said second body with said at least one groove.

13. The rotary actuator according to claim 12 wherein:

said at least one groove comprises walls that extend radially with respect to said longitudinal axis;

said at least one groove comprises a first shoulder on one of said walls to orient said means for sealing;

said second body means comprises a second shoulder for engaging with said first shoulder to orient said means for sealing; and said first shoulder and said second shoulder permit said means for sealing to enter said at least one groove only when said first shoulder and said second shoulder are aligned.

14. The rotary actuator according to claim 12 wherein:

said at least one groove comprises a first wall and a second wall that extend radially with respect to said longitudinal axis;

said at least one groove comprises a base portion circumferential with respect to said longitudinal axis between said first wall and said second wall against which said means for sealing is disposed;

said first wall intersects said base portion at a first edge;

said second wall intersects said base portion at a second edge;

said first edge has a first radius of curvature from said base portion radially outwardly to said first wall;

said second edge has a second radius of curvature from said base portion radially outwardly to said second wall;

said first body has a portion with a third radius of curvature at one end of said first body;

said second body has a portion with a fourth radius of curvature at one end of said second body;

said first radius of curvature is substantially different than said second radius of curvature;

said first radius of curvature is substantially similar to said third radius of curvature;

said second radius of curvature is substantially similar to said fourth radius of curvature; and said means for sealing is solely alignable with said at least one groove when said means for sealing is oriented so that said first radius of curvature is aligned with said third radius of curvature and said second radius of curvature is aligned with said fourth radius of curvature.

15. The rotary actuator according to claim 11 wherein said first portion of said second body and said second portion of said second body comprise one integral piece forming said second body.

16. The rotary actuator according to claim 15 wherein said at least one groove and said second body each comprise at least one chamfer for aligning said second body with said at least one groove.

17. The rotary actuator according to claim 16 wherein:

said at least one groove comprises walls that extend radially with respect to said longitudinal axis;

said at least one groove comprises a first shoulder on one of said walls to orient said means for sealing;

said second body means comprises a second shoulder for engaging with said first shoulder to orient said means for sealing; and said first shoulder and said second shoulder permit said means for sealing to enter said at least one groove only when said first shoulder and said second shoulder are aligned.

18. The rotary actuator according to claim 16 wherein:

said at least one groove comprises a first wall and a second wall that extend radially with respect to said longitudinal axis;

said at least one groove comprises a base portion circumferential with respect to said longitudinal axis between said first wall and said second wall against which said means for sealing is disposed;

said first wall intersects said base portion at a first edge;

said second wall intersects said base portion at a second edge;

said first edge has a first radius of curvature from said base portion radially outwardly to said first wall;

said second edge has a second radius of curvature from said base portion radially outwardly to said second wall;

said first body has a portion with a third radius of curvature at one end of said first body;

said second body has a portion with a fourth radius of curvature at one end of said second body;

said first radius of curvature is substantially different than said second radius of curvature;

said first radius of curvature is substantially similar to said third radius of curvature;

said second radius of curvature is substantially similar to said fourth radius of curvature; and said means for sealing is solely alignable with said at least one groove when said means for sealing is oriented so that said first radius of curvature is aligned with said third radius of curvature and said second radius of curvature is aligned with said fourth radius of curvature.

19. A rotary actuator comprising:

cylinder means;

shaft means;

said shaft means being at least partially surrounded by at least a portion of said cylinder means;

said shaft means having a length and defining a longitudinal axis along the length thereof;

at least one of said shaft means and said cylinder means being rotatable about said longitudinal axis with respect to the other of said shaft means and said cylinder means;

said shaft means comprising an outer wall surface;

at least a portion of said outer wall surface being disposed a substantial distance from said longitudinal axis;

said cylinder means comprising an inner wall surface;

at least a portion of said inner wall surface being disposed about and towards said outer wall surface;

at least a portion of said inner wall surface being disposed substantially concentrically with respect to at least a portion of said outer wall surface to define a chamber therebetween;

said chamber comprises hydraulic fluid;

at least one of:

said shaft means outer wall surface, and said cylinder means inner wall surface comprising at least one projection between said outer wall surface and said inner wall surface to divide said chamber into a first chamber portion and a second chamber portion;

said at least one projection comprising at least one groove disposed in said at least one projection towards the other of:

said shaft means outer wall surface, and said cylinder means inner wall surface;

said at least one groove having a volume;

means for sealing disposed in said at least one groove to minimize the fluid flow between said first chamber portion and said second chamber portion;

said means for sealing comprising:

a first body means;

a second body means separate from said first body means;

said first body means filling a first portion of the volume of said at least one groove;

said second body means filling a second portion of the volume of said at least one groove;

said first body means comprising means for sealing the fluid to minimize flow of fluid between said inner wall surface and said outer wall surface by making sealing contact against one of said inner wall surface and said outer wall surface;

said first portion comprising a substantial portion of the volume of said at least one groove;

said second portion comprising a substantial portion of the volume of said at least one groove;

said second body means not comprising means for sealing a fluid by making sealing contact against one of said inner wall surface and said outer wall surface;

said at least one groove comprising a width in a circumferential direction about said longitudinal axis;

said first body means comprising a first body;

said second body means comprising a second body;

at least a portion of said first body being disposed adjacent to at least a portion of said second body in a circumferential direction across a substantial portion of the width of said at least one groove; and said second body comprising a body other than a sealing body for sealing the fluid to minimize flow of the fluid between said inner wall surface and said outer wall surface by making sealing contact against one of said inner wall surface and said outer wall surface.

20. The rotary actuator according to claim 19, wherein said first body and said second body are separate bodies moveable with respect to one another.

* * * * *

UNITED STATES PATENT AND TRADEMARK OFFICE
CERTIFICATE OF CORRECTION

PATENT NO. : 5,492,051
DATED : February 20, 1996
INVENTOR(S) : Stefan SCHIFFLER and Robert PRADEL It is certified that error appears in the above-indentified patent and that said Letters Patent is hereby corrected as shown below:

In column 4, line 42, before 'These' insert --51.--.

In column 8, line 22, Claim 1, after 'wall', delete "surfacer" and insert --surface,--.

Signed and Sealed this

Twenty-sixth Day of November 1996

Attest:

BRUCE LEHMAN

Attesting Officer     Commissioner of Patents and Trademarks